United States Patent Office 3,094,957
Patented June 25, 1963

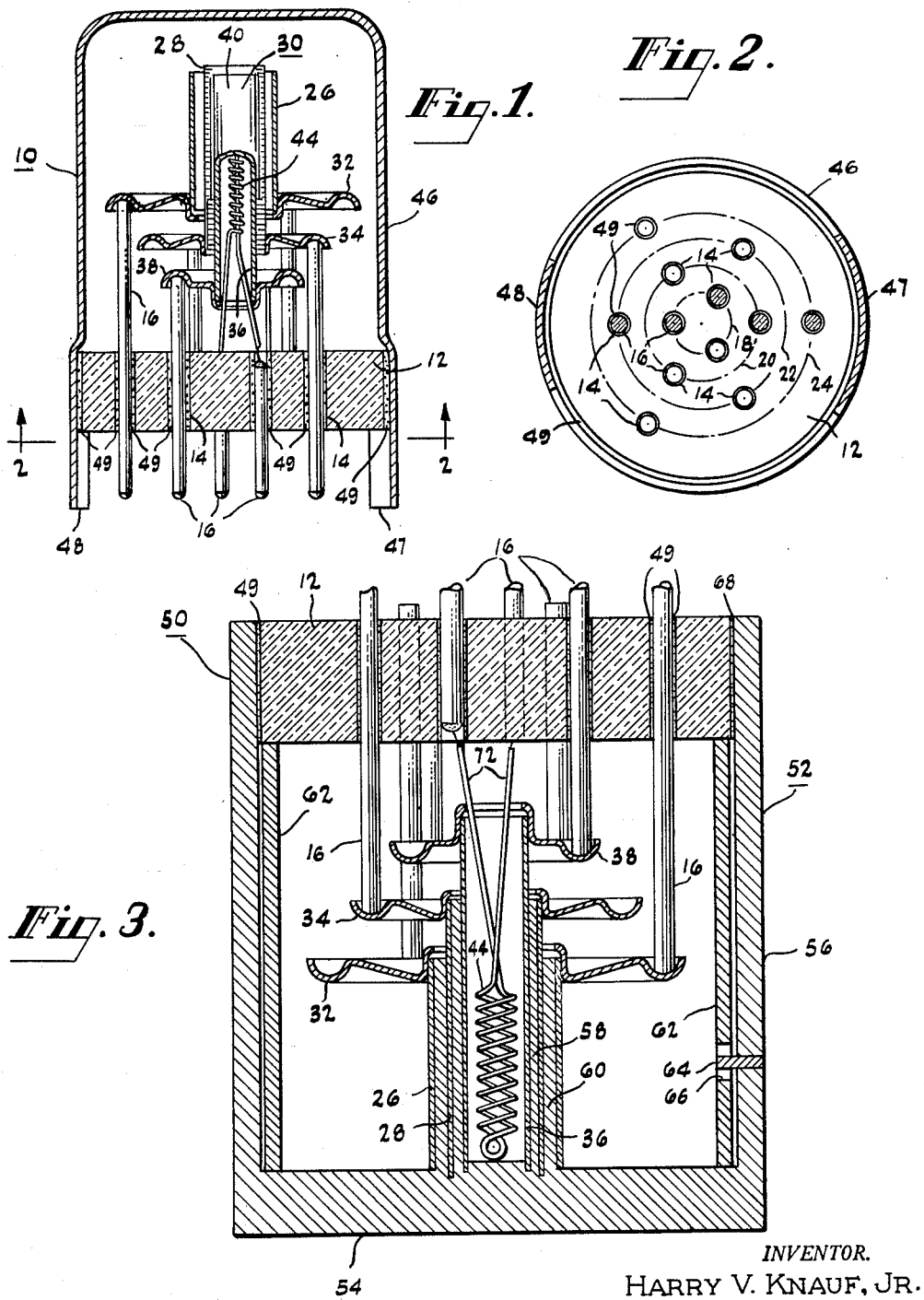

3,094,957
BRAZING JIG FOR ELECTRON TUBE
FABRICATION
Harry V. Knauf, Jr., Mountainside, N.J., assignor to Radio Corporation of America, a corporation of Delaware
Filed Sept. 11, 1959, Ser. No. 839,358
4 Claims. (Cl. 113—99)

This invention relates to a brazing jig for use in the manufacture of electron tubes.

The fabrication of one type of electron tube, hereinafter described, employs a jig for supporting a plurality of tube parts in predetermined loose contacting relationship during brazing operations. The coefficient of expansion of the tube parts are different from each other and from the coefficient of expansion of the jig material. A jig suitable for mass production of such a tube should not only avoid the problem of differential thermal expansion between the jig and the tube parts, which, as hereinafter described, may result in poor brazes, but it must also be rugged, accurate, and relatively inexpensive.

Known low-expansion materials such as molybdenum which can be used at very high temperatures without damage and suitable for use for a jig of the kind desired, are costly and hard to machine. In addition, molybdenum is not easy to oxidize. Oxidation is employed to prevent sticking of the tube parts to the jig during brazing operations.

Ceramic material, while having a more desirable coefficient of expansion, is fragile and very expensive to fabricate. Nichrome, while less expensive than molybdenum, has a coefficient of expansion considerably higher than that of the tube parts.

Because of differential expansion between tube parts and jig parts, it has been the practice to vibrate the tube parts during assembly and to add mass to the parts being brazed by lengthening the leads, for example, to keep the parts in contact during assembly. This complicates the brazing equipment and adds to cost of the leads in waste when leads are cut to proper length.

It is therefore an object of my invention to provide a new and improved brazing jig which is rugged, accurate, inexpensive and which solves the differential expansion problems of the prior art.

According to my invention, I provide a jig which includes a somewhat cup-like housing structure containing a plurality of coaxial tubular elements for jigging the tube electrodes. The cup structure and jigging elements are made of material which permits suitable low cost fabrication. An insert of a different material which is capable of providing the required expansion characteristics is provided within the cup structure for supporting a ceramic disk header in position for brazing. My novel combination structure of the cup and insert part has all of the desirable characteristics pointed out above. A more complete discussion of the requirements of a satisfactory jig and their attainment through the use of my invention is described below in more detail.

In the drawings:

FIG. 1 is a side elevation view in partial section of an electron tube suitable for assembly in the brazing jig of my invention;

FIG. 2 is a bottom plan view taken along line 2—2 of FIG. 1; and

FIG. 3 is a longitudinal section of a brazing jig according to my invention in which certain parts of the electron tube of FIG. 1 are mounted.

In FIGS. 1 and 2, an electron tube 10 adapted to be fabricated in the brazing jig according to the invention is shown. The tube 10 includes a ceramic disk header 12 having a plurality of bores 14 therethrough. A plurality of electrode support and lead-in conductors 16 are sealed in vacuum-tight relation in the bores 14.

As shown in FIG. 2, the bores 14 are arrayed in four concentric circles 18, 20, 22 and 24 shown in phantom. Three bores 14 are disposed in 120°, equidistant, relation on each of the circles. The bores in adjacent circles are angularly displaced 60° to provide maximum spacing therebetween.

The electron tube 10 comprises coaxial cylindrical anode, grid, and cathode electrodes 26, 28 and 30, respectively. The anode 26 is mounted on a radially extending flange 32, which is in turn mounted on three conductors 16 which extend into bores 14 on the outer circle 24. The grid electrode 28 is similarly mounted on a radially extending flange 34 which is in turn mounted on three of the conductors 16 which extend into bores 14 on the circle 22. The cathode 30 comprises a cathode support sleeve 36 mounted on a radially extended flange 38, which is supported on three of the conductors 16 extending into the three bores on the circle 20. The cathode 30 also includes an emissive sleeve 40 which is disposed over the support sleeve 36, and which is coated with a suitable electron emissive material. The inner surface of sleeve 40 and the outer surface of sleeve 36 are sufficiently rough that they may be joined together by sintering. A coiled heater 44 is disposed in the cathode support sleeve 36 and connects to a pair of the conductors 16 which are sealed through two bores 14 on the inner circle 18. A vacuum tight envelope is provided by a cup-shaped shell 46 which is sealed to the periphery of the ceramic disk header 12. The shell 46 includes a pair of extending arcuate tongues 47 and 48 which serve to protect the externally extending conductors 16 and facilitate socketing of the tube. Both of the conductors 16 connecting to the heater 44 extend through the ceramic header 12 and form terminal prongs. Only one conductor 16 of each of the set of three conductors connected respectively to the anode, grid and cathode flanges extend through and beyond the ceramic header 12 to provide terminal prongs.

In one form of the tube 10, the conductors 16 and the side rods of the grid 28 are made of molybdenum; the cathode support sleeve 36 is principally Nichrome; the anode 26 is nickel; and the flanges 32, 34 and 38 are steel.

In the fabrication of the electron tube 10, a metallic coating 49, such as molybdenum, is applied to the ceramic disk header 12 on its outer periphery and on the walls of the bores 14. Such a coating may be applied by any suitable known metallizing process. It has been found expedient to coat all surfaces of the ceramic disk header 12 with molybdenum and then grind the two planar surfaces thereof to remove the coating therefrom. Thus, only the outer periphery and the walls of the bores 14 are left with a metallized coating 49.

The conductors 16 and the flanges 32, 34 and 38 are coated, such as by electroplating, with a brazing material, such as copper. Thus, when the conductors 16 are disposed through the metallized bores 14 and the assembly is heated to a sufficient temperature, vacuum-tight brazed seals are effected between the conductor 16 and the ceramic disk header 12. In similar manner the flanges 32, 34 and 38 are brazed to their respective electrodes and conductors. The shell 46 is sealed to the periphery of the ceramic header 12 in a final hard soldering step. The details of the brazing process will be more fully described with reference to FIG. 3.

In FIG. 3 a two-piece brazing jig 50 according to my invention is shown. The jig 50 comprises a cup-like housing 52 which includes a circular cup base 54 and a hollow circularly cylindrical cup wall 56. A plurality of hollow cylindrical jigging elements 58 and 60, coaxial with the cup wall 56, extend from the cup base 54 within the cup 52. The cup base 54, the cup wall 56, and the jigging elements 58 and 60 may or may not be provided as an integral structure.

The inner cylindrical jigging element 58 has a diameter such that it can receive in snug contacting relation therewithin the cathode support sleeve 36. The wall thickness of the inner jigging element 58 and the inside diameter of the outside jigging element 60 are such that the grid 28 of the electron tube 10 can be snugly received between these two elements. The wall thickness of the inner jigging element 58 is, moreover, such as to result in a desired ultimate spacing of the emissive sleeve 40 from the grid 28 when the emissive sleeve 40 is disposed over the cathode support sleeve 36. The size of the outer jigging element 60 is such that the element 60 snugly receives the anode 26 therearound.

According to the invention, the brazing jig 50 also includes a hollow cylindrical insert support 62 which is adapted to be received coaxially within the cup wall 56 in a loose fit therewith. A pin 64 is fixed in the cup wall 56 after insertion of the support 62 and extends into an opening 66 in the insert 62. The opening 66 is somewhat larger than the pin 64 to accommodate differential axial thermal expansion between the cup wall 56 and the insert 62. The pin 64 serves to retain the insert 62 within the cup 52 so that it does not completely fall out of the cup if the brazing jig 50 should be inverted in handling.

The cup wall 56 serves as a positioning means. It is of suitable inside diameter to snugly receive and thus laterally position the ceramic disk header 12 of the electron tube 10 therein. Since the primary purpose of the wall 56 is simply to laterally position the disk header 12, it will be appreciated that the wall 56 need not be a circumferentially continuous hollow cylinder. If desired it may comprise only a plurality of posts or circumferential sections of a hollow cylindrical wall.

The ceramic disk header 12 is axially supported upon the end of the insert 62, which in turn rests on the cup base 54. The insert 62 is of a length suitable to provide a selected spacing of the anode, grid, and cathode electrodes 26, 28, and 30 respectively from the ceramic disk header 12. It will also be appreciated that since the function of the insert 62 is simply to axially support the disk header 12, the insert 62, likewise, need not comprise a circumferentially continuous hollow cylinder. If desired, the insert support 62 may be provided as a single or a plurality of any suitably shaped elements which rest on the base 54 and extend to provide axial support for the disk header 12.

In accordance with the invention, the insert 62 is provided of a material which will exhibit the same or less axial thermal expansion than the electron tube parts disposed in the jig 50. On the other hand the cup 52 may be provided of material which is most suitable to being formed to provide the inner and outer jigging cylinders 58 and 60 and which can best be surface conditioned to prevent sticking of the tube parts thereto during the brazing operation. In the preferred embodiment of the jig 50, the insert 62 is made of molybdenum and the cup 52 is made of Nichrome provided with an oxidized surface.

In the assembly and fabrication of the electron tube 10, the jig 50 is oriented with the open end up. As shown in FIG. 3, an anode 26, a grid 28, and a cathode support sleeve 36 are loaded into contact with the inner and outer jigging elements 58 and 60. Such loading is facilitated with a loading device (not shown) which is jigged against the rim 68 of the cup wall 56.

An anode flange 32, a grid flange 34, and a cathode flange 38 are deposited in the order named on their respective electrodes. The flanges and electrodes may be assembled as a unit and simultaneously placed in the jig, the anode and its flange being inserted in the jig first. The two legs 72 of a coil heater 44 are attached to a pair of conductors 16 which are inserted in proper bores 14 in the ceramic disk header 12. The header 12 is then disposed in the jig cup 52 on top of the insert 62. The remaining nine conductors 16, three for each electrode flange, are loaded into their proper bores in the header 12. The conductors 16 are such that they fit snugly within the bores 14 but are nevertheless slidable therein so that they may drop downwardly and into contact with their respective electrode flanges. Prior to such assembly the ceramic header 12 has been provided with metallic coatings 49 on the outer periphery 48 and the walls of the bores 14 as hereinbefore described. The conductors 16 and the three electrode support flanges 32, 34, and 38 have been previously coated with a suitable brazing material (not shown).

The assembly of the jig 50 and the electron tube parts shown in FIG. 3 are then inserted in a furnace and heated in a reducing atmosphere to a temperature sufficient to melt the brazing material on the conductors 16 and on flanges 32, 34, and 38 and fuse the electron tube parts together.

Following this brazing operation, the cathode emissive sleeve 40 is placed over the cathode support sleeve 36 and the envelope shell 46 is fitted in contact with the ceramic header 12. A preformed ring of a hard solder is positioned in contact with the tube shell 46 and the ceramic header periphery 48. This assembly results in a complete tube assembly which is then subjected to a final furnace heating in vacuum. This final processing step serves to evacuate the tube, sinter the cathode emissive sleeve 40 to the cathode support sleeve 36, and solder the shell 46 to the periphery 48 of the header 12. The temperature employed in this final step is substantially below the previous brazing temperature. Accordingly, the previously made brazes are not affected.

In the brazing of the subassembly of the electron tube 10 of FIG. 3, both the tube parts in the jig and the jig itself expand axially. If the axial expansion of that portion of the jig which supports the disk header 12 is greater than the total axial expansion of the tube parts, the ceramic header 12 will be lifted upwardly and possibly carry the conductors 16 out of contact with their respective electrode flanges 32, 34, and 38. If this lifting occurs before the brazing is completed, the conductors 16 may not become attached to their respective flanges. Such has been the problem with prior art brazing jigs.

It is known to vibrate the assembly during brazing thereof to cause the conductors 16 to settle downwardly upon their respective flanges. However, such vibrating is undesirable for at least two reasons. First, it is difficult and expensive to facilitate mass production equipment with suitable vibrators. Second, excessively long conductors 16 must be provided in order to give sufficient mass to the conductors so that they will be settled downwardly by the vibration. Providing of excessively long conductors is wasteful and expensive. By making the part of any jig which serves as the support member for the ceramic header 12 of a material which has an axial thermal expansion equal to or less than the total axial thermal expansion of the tube parts, i.e. the electrodes, their flanges and their conductors, assembled in the jig, a secure braze may be achieved without vibrating and without other expensive or difficult precautions. If the expansion of the header support is less than that of the tube parts, the conductors 16 will be forced upwardly through the bores 14 in the header 12 and be thus maintained in contact with their respective electrode support flanges.

If a prior art one-piece jig is used, wherein the outer cylindrical jig wall serves as a support for the ceramic header 12, the entire jig must be made of a suitable low expansion material. Suitable low expansion materials, such as molybdenum, tungsten, and ceramic, are, generally speaking, expensive to machine. Moreover, the preferred material, molybdenum, cannot be easily surface conditioned to prevent sticking of the tube parts thereto.

Combination Nichrome-molybdenum or ceramic-molybdenum jigs have been proposed in which the base of the jig is made of Nichrome or ceramic and the cylindrical wall of molybdenum. If these parts are brazed together to provide an integral cup-like jig, differential radial expansion problems are encountered. The Nichrome or ceramic base tends to expand radially a greater amount than the molybdenum cylindrical wall. This creates a strain which can result in damage to the jig.

On the other hand, if a combination Nichrome-molybdenum or ceramic-molybdenum jig is provided in two separate parts such that a molybdenum cylindrical wall rests on a peripheral shoulder of the Nichrome or ceramic base, a loose radial fit therebetween must be provided so as to accommodate differential radial expansion. Such a loose fit is unsatisfactory for at least two reasons. First, the molybdenum cylindrical wall can be removed thus exposing the delicate jigging elements 58 and 60 to possible physical damage. Second, loading of the anode, grid, and cathode support sleeve is made more difficult since such loading is often jigged against the rim of the outer cylindrical wall. If this wall is not precisely coaxial with the jigging elements 58 and 60, severe loading problems are created.

From the preceding description of the brazing jig 50 according to my invention, it will be appreciated that all of these problems are satisfactorily solved. By virtue of supporting the ceramic header 12 on the molybdenum insert 62, the desired axial expansion relationships are obtained. That is, the axial thermal expansion per unit length, or coefficient of expansion, of the insert 62 is no greater than that of the assembly of tube parts. Moreover, since the support member, i.e., the insert 62, is a simple element, expensive machining is avoided. At the same time, an integral cup 52 can be provided of a suitable low-cost material which yet results in accurate and rugged jigging elements 58 and 60. The provision of the one-piece cup 52 also provides the required precise coaxial relationship between the rim 68 and the jigging elements 58 and 60 as is desired for loading the anode, grid, and cathode support sleeve.

What is claimed is:
1. A brazing jig for supporting electron tube parts in predetermined spaced relationship during brazing operations comprising a housing including a base and side wall portions extending from said base on one side thereof, at least one jigging element extending from said base within said housing, and an insert support member of a material different from that of said housing side wall for supporting one of said tube parts, said insert resting on said base within said housing in a loose fit therewith and extending from said base part way along said wall portions, said insert exhibiting an axial thermal expansion for a given temperature rise no greater than the total axial thermal expansion of that portion of said tube parts disposed between the ends of said insert.

2. A brazing jig for supporting electron tube parts in predetermined spaced relationship during brazing operations comprising a housing having a base and wall portions extending from said base on one side thereof, said wall portions having a jigging surface internally of said housing, a pair of hollow cylinders extending from said one side of said base within said housing in fixed spaced relationship with said jigging surfaces and an insert support member of a material different from that of said housing for supporting one of said tube parts, said insert exhibiting an axial thermal expansion for a given temperature rise no greater than the total axial thermal expansion of that portion of said tube parts disposed between the ends of said insert, said insert being disposed within said housing in a loose fit therewith and extending from said base part way along said wall portions.

3. A brazing jig for receiving an assembly of electron tube parts including a plurality of hollow cylindrical electrodes and supports therefor in concentric mutually spaced relation and a circular disk wafer perpendicularly to the common longitudinal axis of said electrodes and spaced therefrom along said axis; said wafer having apertures through which conductors are disposed in contacting relation therewith and with said supports; said jig comprising a cup including a base member and a hollow cylindrical wall member; a pair of hollow cylindrical jigging members extending from said base within said cup and concentric with said wall; and insert support means made of a material different than that of said wall member and adapted to be disposed within said wall in a loose fit therewith; said pair of hollow cylindrical jigging members being adapted to receive said electrodes in loose contacting relationship to concentrically position said electrodes during brazing operations; said insert means being adapted to support said disk wafer in said axial spaced relation with said electrodes during brazing operations; the coefficient of thermal expansion of said insert means being sufficiently low relative to that of said electrodes, supports, and conductors that when said assembly of tube parts is heated to brazing temperature, the portion of said conductors contacting said wafer will be moved away from said base member because of the thermal expansion of said electrodes, supports, and conductors at least as far as said wafer is moved away from said base member because of the thermal expansion of said insert 4. A brazing jig for receiving a plurality of tubular electron tube parts and supports therefor in coaxial mutually spaced relation, and a disk wafer perpendicularly to the common longitudinal axis of said tube parts and spaced along said axis from said tube parts, said wafer having apertures therein through which conductors are extended into contact with said supports, said jig comprising a cup including a base member and a tubular wall member extending from said base member, a pair of hollow tubular jigging elements extending from said base member within said cup and coaxial with said wall member, and an insert support member disposed on said base member within and adjacent to said wall member in a loose fit therewith said base member and said elements being adapted to receive said tube parts to position and support said tube parts and their supports during the brazing operation, and said wall member and said insert being adapted to receive said disk wafer to position and support said wafer during brazing operation, said insert being of a material different from that of said tubular wall member and exhibiting no greater axial thermal expansion for a given temperature increase than the total axial thermal expansion of that portion of said tube parts, their supports and said conductors which is disposed between said base member and said wafer.

References Cited in the file of this patent
UNITED STATES PATENTS

| | | |
|---|---|---|
| 2,310,841 | Curtis | Feb. 9, 1943 |
| 2,599,394 | Kohl | Nov. 19, 1949 |